United States Patent
Jung et al.

(10) Patent No.: US 8,606,173 B2
(45) Date of Patent: Dec. 10, 2013

(54) COMMUNICATION RELAY METHOD AND APPARATUS BASED ON OBJECT SENSING FUNCTION

(75) Inventors: Kiung Jung, Seoul (KR); Woo-Goo Park, Daejeon (KR); Sunhee Yang, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 427 days.

(21) Appl. No.: 12/813,203

(22) Filed: Jun. 10, 2010

(65) Prior Publication Data
US 2010/0317286 A1 Dec. 16, 2010

(30) Foreign Application Priority Data

Jun. 11, 2009 (KR) .................. 10-2009-0052006
Mar. 24, 2010 (KR) .................. 10-2010-0026256

(51) Int. Cl.
*H04B 7/14* (2006.01)
*H04W 88/04* (2009.01)

(52) U.S. Cl.
USPC ............ 455/7; 455/11.1; 455/515; 455/452.2

(58) Field of Classification Search
USPC ......... 455/7, 11.1, 13.1, 426.1, 452.1, 525, 9, 455/67.11, 452.2, 515, 434; 370/226, 315
See application file for complete search history.

(56) References Cited

U.S. PATENT DOCUMENTS

2008/0200195 A1* 8/2008 Abe et al. ...................... 455/501
2012/0088500 A1* 4/2012 Bugenhagen et al. ..... 455/426.1

FOREIGN PATENT DOCUMENTS

KR 10-2006-0121620 11/2006
KR 10-2008-0085323 9/2008

* cited by examiner

*Primary Examiner* — John J Lee
(74) *Attorney, Agent, or Firm* — Staas & Halsey LLP (57) ABSTRACT

A communication relay method of a communication relay apparatus in a multi-mode wireless environment includes: sensing a wireless access environment of a terminal based on an object sensing function; deciding whether or not to provide a predetermined communication relay service to the terminal; and deciding an operation network which is to provide the predetermined communication relay service.

20 Claims, 7 Drawing Sheets

COMMUNICATION RELAY METHOD AND APPARATUS BASED ON OBJECT SENSING FUNCTION

CROSS-REFERENCE(S) TO RELATED APPLICATIONS

The present application claims priority of Korean Patent Application Nos. 10-2009-0052006 and 10-2010-0026256, filed on Jun. 11, 2009, and Mar. 24, 2010, respectively,) which are incorporated herein by reference in their entirety.

BACKGROUND OF THE INVENTION

1. Field of the Invention

Exemplary embodiments of the present invention relate to a communication relay method and apparatus; and, more particularly, to a communication relay method and apparatus based on an object sensing function.

2. Description of Related Art

In general, a wireless communication system has been developed to provide a voice and data service to users while securing mobility. Furthermore, as the wireless communication technology has rapidly developed, a variety of wireless communication systems are being commonly used. Wireless communication systems which are being commonly used or have been commonly used may include a mobile communication system, a wireless LAN (WLAN) system, a Bluetooth system, a ZigBee system, a Wireless Fidelity (WiFi) system, a Wireless Broadband (WiBro) system, a satellite communication system, a broadcasting communication system, and a telematics system.

Such wireless communication systems have different characteristics and frequency bands depending on the service communication protocols thereof. Therefore, a terminal enrolling in a specific service may receive a service only from a service system providing the specific service. When the terminal enters a different service system, the terminal may not receive a service, unless a roaming service is provided. Furthermore, different service systems may have different frequency bands or communication protocols. As such, when the communication protocols and frequency bands used in different service systems are different from each other, terminals should meet a variety of requirements to receive a roaming service. Such requirements make it difficult to provide cheap terminals and to reduce the size and weight of the terminals. Furthermore, when a terminal enrolling in a specific service is positioned in a shadow area or moves out of the service area, or when a channel environment between a terminal and a wireless base station is poor, it is impossible to provide a service satisfying a quality desired by users.

Meanwhile, a specific wireless communication system may exhibit lower resource usage efficiency than other wireless communication systems. That is, the amount of resources used in the same area may differ for each wireless communication system. For example, a certain wireless communication system may use only a very small amount of resources, and another wireless communication system may lack in resources. In this case, the wireless communication system lacking in resources may not provide a smooth service.

SUMMARY OF THE INVENTION

An embodiment of the present invention is directed to a communication relay method and apparatus which accepts the original access scheme of a legacy terminal and selectively connects the legacy terminal to a wireless network through a mode switching function or the like.

Another embodiment of the present invention is directed to a communication relay method and apparatus which senses a channel environment which always varies in a time or frequency region, and provides an optimal communication quality.

Another embodiment of the present invention is directed to a communication relay method and apparatus which is capable of solving a problem in the cell boundary of a wireless communication system or an area in which a specific mode of wireless communication service is not provided.

Another embodiment of the present invention is directed to a communication relay method and apparatus which satisfies a request of an adaptive wireless communication service for optimally using wireless resources.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

In accordance with an embodiment of the present invention, a communication relay method of a communication relay apparatus in a multi-mode wireless environment includes: sensing a wireless access environment of a terminal based on an object sensing function; deciding whether or not to provide a predetermined communication relay service to the terminal; and deciding an operation network which is to provide the predetermined communication relay service.

In accordance with another embodiment of the present invention, a communication relay method of a communication relay apparatus in a multi-mode wireless environment includes: sensing two or more terminals using the same mode through an object sensing function; searching for a network corresponding to the same mode as that of the two or more terminals; and providing a predetermined communication relay service to the two or more terminals based on the searching result.

In accordance with another embodiment of the present invention, a communication relay apparatus in a multi-mode wireless environment includes: a sensing unit configured to sense a wireless connection environment of a terminal through an object sensing function; a decision unit configured to decide whether or not to provide a predetermined communication relay service to the terminal; and a control unit configured to decide an operation network which is to provide the predetermined communication relay service.

In accordance with another embodiment of the present invention, a communication relay apparatus in a multi-mode wireless environment includes: a sensing unit configured to sense two or more terminals using the same mode through an object sensing function; a network searching unit configured to search for a network corresponding to the same mode as that of the two or more terminals; and a control unit configured to provide a predetermined communication relay service to the two or more terminals by using the searching result.

DESCRIPTION OF SPECIFIC EMBODIMENTS

Exemplary embodiments of the present invention will be described below in more detail with reference to the accompanying drawings. The present invention may, however, be embodied in different forms and should not be constructed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

Exemplary embodiments of the present invention provides a communication relay method and apparatus which senses the connection state and the network environment of a legacy terminal in a multi-mode wireless environment, accepts the wireless connection mode of the terminal regardless of the wireless connection mode, and connects the terminal to a wireless network having an optimal channel environment through a mode switching function or the like, thereby providing a high-quality communication service.

First, the concept and main functions of the communication relay method and apparatus in accordance with the embodiments of the present invention will be described.

(1) Accommodate Any-mode Anywhere (AAA) system refers to a network system which may freely operate in accordance with any mode. To implement the AAA system, a virtual united wireless network is basically built, which realizes the multi-mode access while maintaining unique access modes or operation mechanisms of heterogeneous terminals or common-use networks.

(2) Universal Wireless Channel Access (hereafter, referred to as UWA) refers to a multi-mode wireless connection scheme which accepts a terminal of a certain network in a wireless environment in which heterogeneous networks are mixed, regardless of the modes of the respective networks, and provides a wireless environment having an optimal or desired quality among current wireless environments, while maintaining the access mode or operation mechanism of the terminal or network. A mode reconfiguration and switching function may be used to build a virtual united wireless network which optimizes channel usage efficiency such as frequency usage efficiency. Alternatively, wireless channels in a sleep mode may be sensed in a current wireless environment, and then used, moved, or merged to implement a virtual united wireless network which optimizes the channel usage efficiency.

(3) Reconfigurable Access Station (hereafter, referred to as RAS) is a core system for implementing the UWA, and may serve as a switch between heterogeneous wireless networks, which provides a multi-mode wireless access function to a terminal, or a gateway to a virtual united wireless network. The RAS has a wireless environment sensing function and a cooperative communication function between heterogeneous networks or with a different system, and provides a service for accessing a heterogeneous mode network to a terminal through a mode reconfiguration function, a network switching function, and a relay connection function. Furthermore, the RAS has a channel sensing and channel switching function for building a closed virtual group network, a channel aggregation function for the co-existence between heterogeneous modes, and a channel leasing function.

The RAS corresponds to an embodiment of the communication relay apparatus implemented by the present invention. Hereafter, the function and role of the RAS will be described in detail.

(4) Object sensing, which is a core concept of the present invention, refers to such an operation concept that a legacy terminal is passively sensed by a certain device or the like. In typical technology, a terminal capable of supporting a multi-mode function senses an environment in which different modes of wireless networks are mixed, selects a mode in which an optimal service may be provided, and provides a service integrated with a base station by requesting the base station to perform mode switching. In the object sensing, however, the communication between homogeneous or heterogeneous networks may be performed by accepting the mode and access scheme of a legacy terminal regardless of whether the legacy terminal supports the multi-mode function. Therefore, to implement the wireless multi-mode access in accordance with the embodiment of the present invention, the RAS excludes the behavior of the terminal and selectively connects a terminal to a network through the mode reconfiguration and switching function thereof.

In the embodiments of the present invention, the object sensing function of the RAS includes two basic operations. First, when a legacy terminal is connected to a network with a unique mode, the RAS senses that the service quality of the network to which the legacy terminal is connected is vulnerable, due to serious fading in the wireless environment or weak signal intensity around a cell. This operation includes a passive scanning operation in which the RSA senses a certain electrical signal transferred from the terminal. Second, when a legacy terminal does not find a network supporting the mode of the legacy terminal, that is, when a specific mode of infrastructure is not installed in a specific area, the RAS performs an active scanning operation such as searching beacon transmission for actively searching for a terminal which is requesting a service.

Hereafter, the communication relay method and apparatus in accordance with the embodiments of the present invention will be described.

Figure 1:
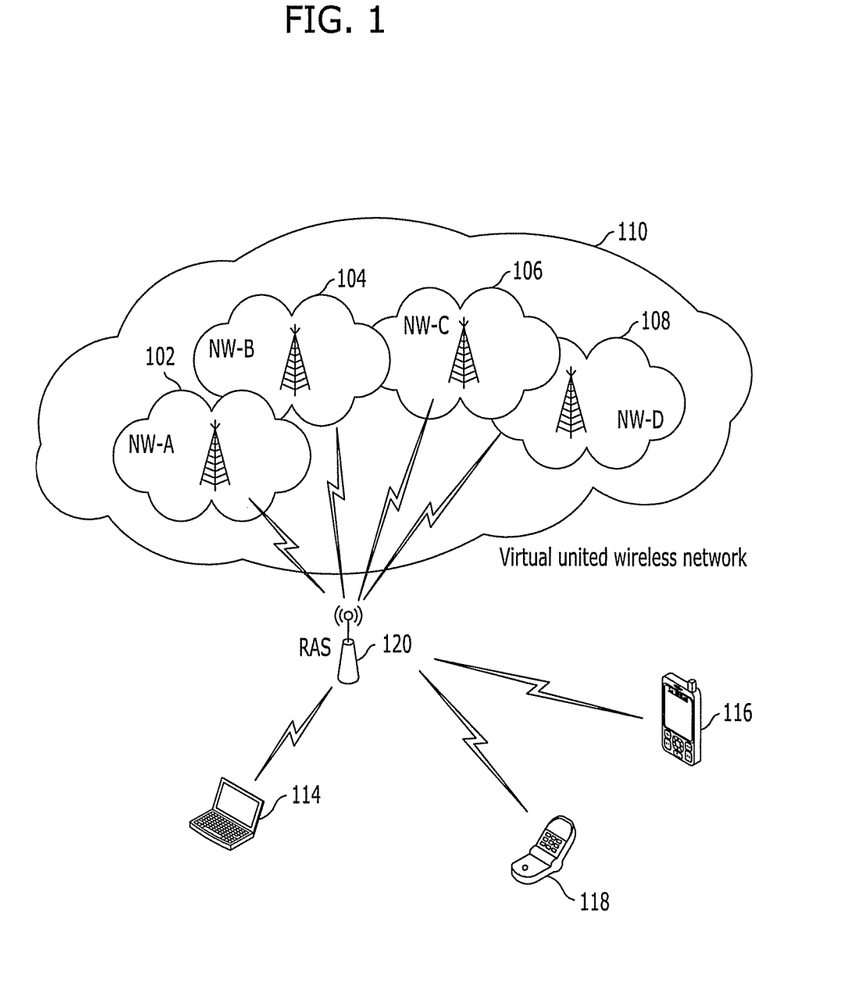
FIG. 1 is a conceptual diagram explaining the implementation of an Accommodate Any-mode Anywhere (AAA) system in a wireless communication system in accordance with an embodiment of the present invention.

FIG. 1 is a conceptual diagram explaining the implementation of the AAA system in a wireless communication system in accordance with an embodiment of the present invention.

A virtual united wireless network 110 includes various modes of wireless networks 102, 104, 106, and 108, which are virtually united in a state in which they are sensed by an RAS 112 which is the communication relay apparatus in accordance with the embodiment of the present invention. Terminals 114, 116, and 118 have enrolled in at least one wireless network. Each of the terminals 114, 116, and 118 may not only access the wireless network in which the terminal has enrolled, by using its own unique access mode, but may also access a different mode of wireless network through the mode reconfiguration and communication relay function of the RAS 112.

Figure 2:
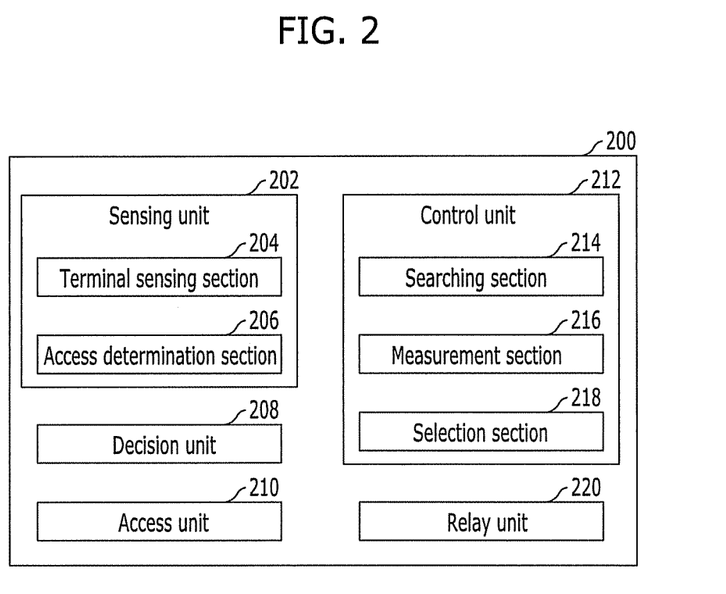
FIG. 2 is a configuration diagram of a communication relay apparatus in accordance with an embodiment of the present invention.

FIG. 2 is a configuration diagram of the communication relay apparatus in accordance with the embodiment of the present invention.

Referring to FIG. 2, the communication relay apparatus in accordance with the embodiment of the present invention includes a sensing unit 202, a decision unit 208, an access unit 210, a control unit 212, and a relay unit 220. The sensing unit 202 includes a terminal sensing section 204 and an access determination section 206, and the control unit 212 includes a searching section 214, a measurement section 215, and a selection section 218.

The sensing unit 202 is configured to sense the wireless access environment of a terminal through the object sensing function. As described above, the object sensing refers to such a concept that a terminal does not sense a wireless network environment on its own, but is passively sensed by a different device and accepted in a state in which the behavior of the terminal is excluded. The wireless access environment is a term indicating the mode of a terminal, whether the terminal is connected to a network corresponding to the mode of the terminal or not, and the state of an access channel.

The terminal sensing section 204 is configured to sense the mode of a terminal, that is, a specific wireless access scheme. The terminal includes a multi-mode terminal and a single-mode terminal. The multi-mode terminal refers to a terminal which may access various modes of networks on its own, like a smart phone which has been recently introduced. The single-mode terminal refers to a terminal which may access only a specific mode of network, like a second-generation mobile phone.

The access determination section 206 is configured to determine whether or not the terminal is connected to a network corresponding to the mode of the terminal. When the terminal is connected to the network, the access determination section 206 determines whether an access channel is available or not. The access channel is not available in a case in which an access trouble occurs due to a geographical element in an area where a network base station and the terminal are positioned, a case in which the effect of interference caused by another network is large, a case in which the intensity of a signal is weak because the terminal is positioned at the boundary of cells, or a case in which an excessively large number of users simultaneously access a network in the corresponding area such that an access trouble occurs.

The decision unit 208 is configured to decide whether or not to provide a predetermined communication relay service to a terminal. The connection state between the terminal and a network corresponding to the mode of the terminal may be divided into three cases. First, the terminal may not be connected to the network. Second, the terminal may be connected to the network, but an access channel may not be available. Third, the terminal may be connected to the network, and the access channel may be available. The decision unit 208 decides to provide the predetermined communication relay service to the terminal in the first and second cases. That is, when the terminal is not connected to the network corresponding to the mode of the terminal, the decision unit 208 decides to provide a communication relay service using an active scanning operation for actively searching for such a terminal. When the terminal is connected to the network corresponding to the mode of the terminal but the access channel is not available, the decision unit 208 decides to provide a communication relay service using a passive scanning operation for receiving a certain electrical signal transferred from such a terminal.

The control unit 212 is configured to decide an operation network which is to provide the predetermined communication relay service to the terminal. When the decision unit 208 decides to provide a communication relay service, the searching section 214 searches for an accessible network in a current network environment, and the measurement section 216 measures the quality of service (QoS) of the searched-for network. The QoS refers to a communication quality when the terminal is connected to the network. Specifically, the QoS may be a numerical value obtained by considering the degree of interference by the natural environment of an area where the terminal and the network base station are positioned, the channel occupation state by service users in the corresponding area, and the data reception/transmission rates through the mode of the corresponding network. Therefore, as the interference is low, the number of channels occupied by users is small, and the data reception/transmission rates are increased by using a wide band channel in the corresponding mode, the QoS may increase. The selection section 218 selects a network having the highest QoS as the operation network, depending on the measurement result.

The access unit 210 accesses the terminal by using the mode of the terminal, and accesses the operation network by using the mode of the operation network. When the operation network to provide the communication relay service is decided by the control unit 212, the access unit 210 accesses the terminal and the operation network to directly relay the communication between the terminal and the operation network. At this time, since the access unit 210 accesses the terminal without changing the mode of the terminal, the mode of the terminal may be different from the mode of the operation network. In this case, however, the wireless communication relay apparatus may relay the communication between heterogeneous modes through the mode reconfiguration and switching function.

The relay unit 220 is configured to relay the communication between the terminal and the operation network, which are accessed. The relay unit 220 may include a reception section configured to receive information from the terminal and the operation network and a transmission section configured to transmit information to the terminal and the operation network.

Figure 3:
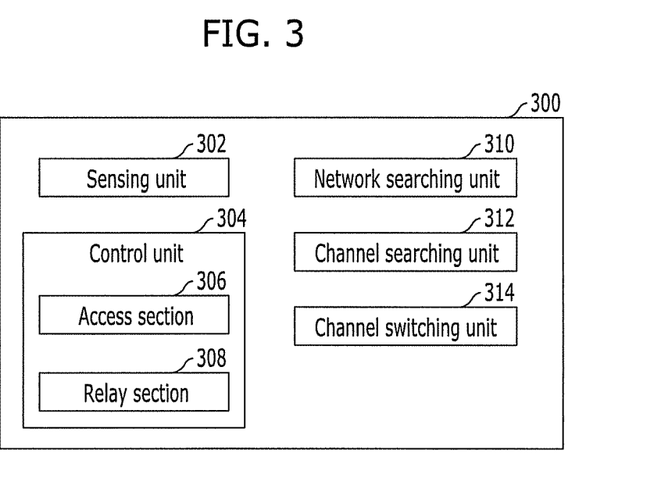
FIG. 3 is a configuration diagram of a communication relay apparatus in accordance with another embodiment of the present invention.

FIG. 3 is a configuration diagram of a communication relay apparatus in accordance with another embodiment of the present invention.

Referring to FIG. 3, the communication relay apparatus in accordance with the embodiment of the present invention includes a sensing unit 302, a control unit 304, a network searching unit 310, a channel searching unit 312, and a channel switching unit 314. The control unit 304 includes an access section 306 and a relay section 308.

The sensing unit 302 is configured to sense a group of terminals using the same mode through the object sensing function. For example, the sensing unit 302 may sense a group of terminals by sensing the mode of a specific terminal and finding terminals using the same mode as that of the specific terminal.

The network searching unit 310 is configured to search for a network corresponding to the same mode as that of the terminals sensed by the sensing unit 302.

The control unit 304 is configured to provide a predetermined communication relay service to the terminals depending on the search result of the network searching unit 310. When the network corresponding to the same mode as that of the terminals exists, the control unit 304 relays the communication between the terminals and the network. When the network corresponding to the same mode as that of the terminals does not exist, the control unit 304 directly relays the communication between the terminals.

The access section 306 is configured to access the terminals and the network when the network corresponding to the same mode as that of the terminals exist, that is, when a specific mode of infrastructure is installed in the corresponding area, and access only the terminals when the network corresponding to the same mode as that of the terminals does not exist. The access section 306 may access two or more terminals at the same time.

The relay section 308 is configured to relay the communication between the terminals and the network which are accessed, when the network corresponding to the same node as that of the terminals exist, and directly relay the communication between the accessed terminals when the network corresponding to the same mode as that of the terminals does not exist. When relaying the communication relay between the terminals, the relay section 308 serves as a kind of base station. At this time, the communication between the terminals may be performed one-to-many as well as one-to-one. For example, it may be assumed that many people have a radio-type terminal. In this case, when one person talks over the radio-type terminal, the voice may be received to the other people having the radio-type terminal using the same mode.

The channel searching unit 312 is configured to search the states of channels occupied by the networks in the corresponding area, and determines whether or not the communication relay channel between the terminals is used by a certain network, in consideration of variations in the wireless environment of the area. That is, the channel searching unit 312 performs a channel sensing function.

The channel switching unit 314 is configured to select a sleep channel, which is not currently used, as a communication relay channel between the terminals, when the channel searching unit 312 determines that the communication relay channel between the terminals is used by another network. That is, the channel switching unit 314 performs a channel switching function. This accepts a cognitive radio (CR) function.

The above-described communication relay apparatus may be utilized in various cases. For example, when an aid group is dispatched to an underdeveloped country where a natural disaster such as an earthquake has occurred in order to carry out relief activities, the communication relay apparatus may be installed in the corresponding area such that team members of the aid group using the same terminals communicate with each other, even though the underdeveloped country does not have a communication infrastructure at all.

Hereafter, a communication relay method in accordance with another embodiment of the present invention will be described. In the following descriptions, the communication relay apparatus will be represented by the RAS corresponding to an embodiment of the communication relay apparatus implemented by the present invention.

Figure 4:
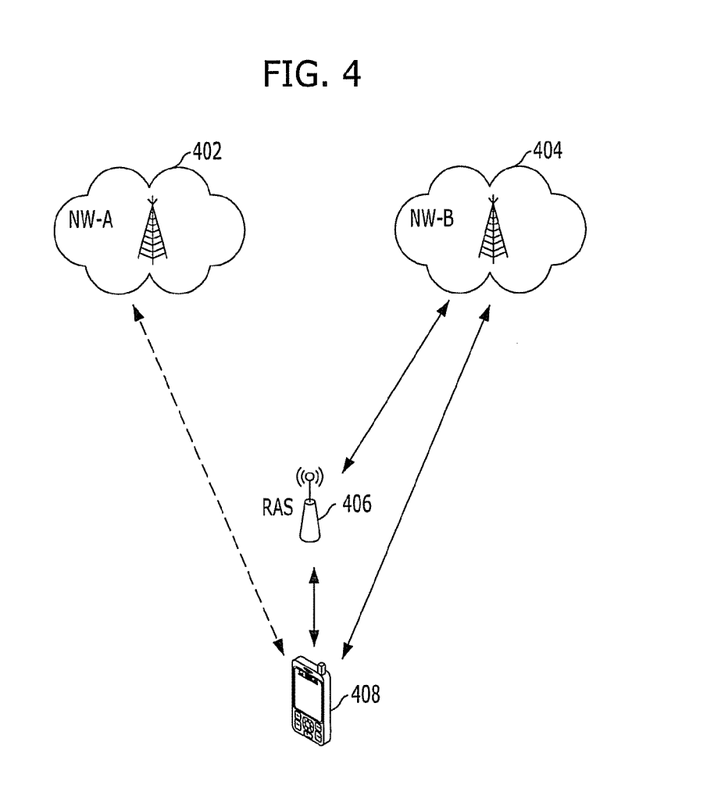
FIG. 4 is a diagram explaining a communication relay method in accordance with another embodiment of the present invention.

FIG. 4 is a diagram explaining the communication relay method in accordance with the embodiment of the present invention.

FIG. 4 illustrates a case in which a terminal 408 is positioned in an area in which a network A 402 and a network B 403 using heterogeneous modes are mixed. The terminal 408 is currently connected to the network A 402 to receive a service. The RAS 406 senses that the channel state between the terminal 408 and the network A 402 is poor, by using the object sensing function through the passing scanning operation. That is, the RAS 406 senses that the network A 402 is not available because the QoS thereof is low. The RAS 406 searches neighboring networks and connects the terminal 408 to the network B 404 to provide an improved quality of service. The RAS 406 performs a predetermined confirmation procedure among the network A 402, the network B 404, and the terminal 408, accesses the terminal 408 using the mode of the terminal 408, and accesses the network B 404 using the mode of the network B. After that, the RAS 406 relays the communication between the terminal 408 and the network B 404 using the mode reconfiguration function, in order to provide an uninterrupted stable service to a user.

Figure 5:
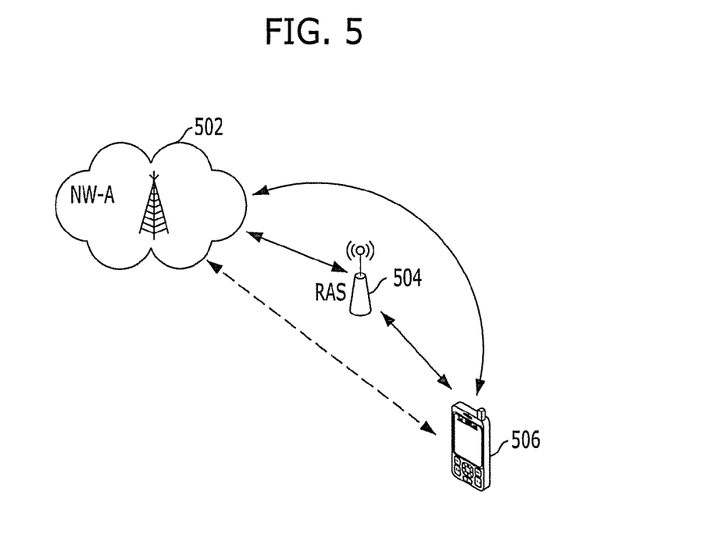
FIG. 5 is a diagram explaining a communication relay method in accordance with another embodiment of the present invention.

FIG. 5 is a diagram explaining a communication relay method in accordance with another embodiment of the present invention.

FIG. 5 illustrates a case in which a terminal 506 is connected to a network A 502 to receive a service. A RAS 504 senses that the channel state between the terminal 506 and the network A 502 is poor, by using the object sensing function through the passive scanning operation. The RAS 504 confirms that an improved quality of service may be provided through a relay channel, when the RAS 504 serves as a relay node between the terminal 506 and the network A 502. The RAS 504 performs a predetermined confirmation procedure between the network A 502 and the terminal 506, and relays the communication between the terminal 506 and the network A 502 through the relay channel, in order to provide an uninterrupted stable service to a user.

Figure 6:
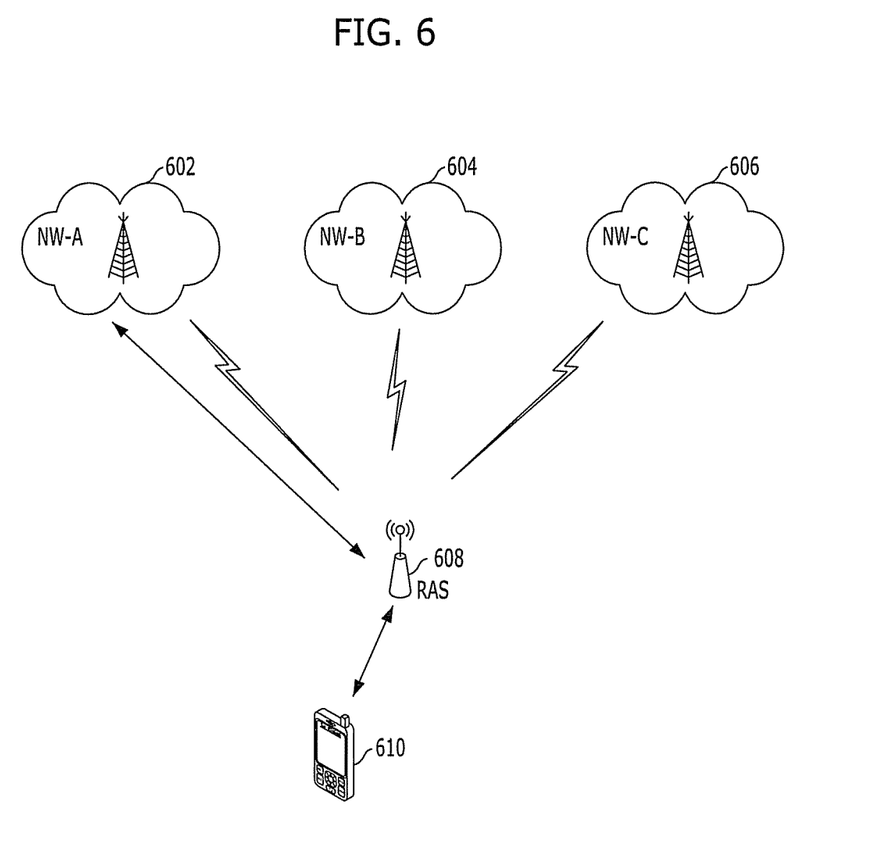
FIG. 6 is a diagram explaining a communication relay method in accordance with another embodiment of the present invention.

FIG. 6 is a diagram explaining a communication relay method in accordance with another embodiment of the present invention.

FIG. 6 illustrates a state in which the service is stopped because a terminal 610 is not connected to a neighboring network. A RAS 608 senses the mode of the terminal 610 by using the object sensing function through the active scanning operation, and confirms that the terminal 610 is requesting the service. The RAS 608 senses the modes of a network A 602, a network B 604, and a network C 606, which are positioned in the neighborhood, and serves as a relay node between the terminal 610 and the network A 602 to confirm that the service may be provided to the terminal 610. The RAS 608 accesses the terminal 610 and the network A 602 and provides a stable service to a user using the mode reconfiguration and relay function.

Figure 7:
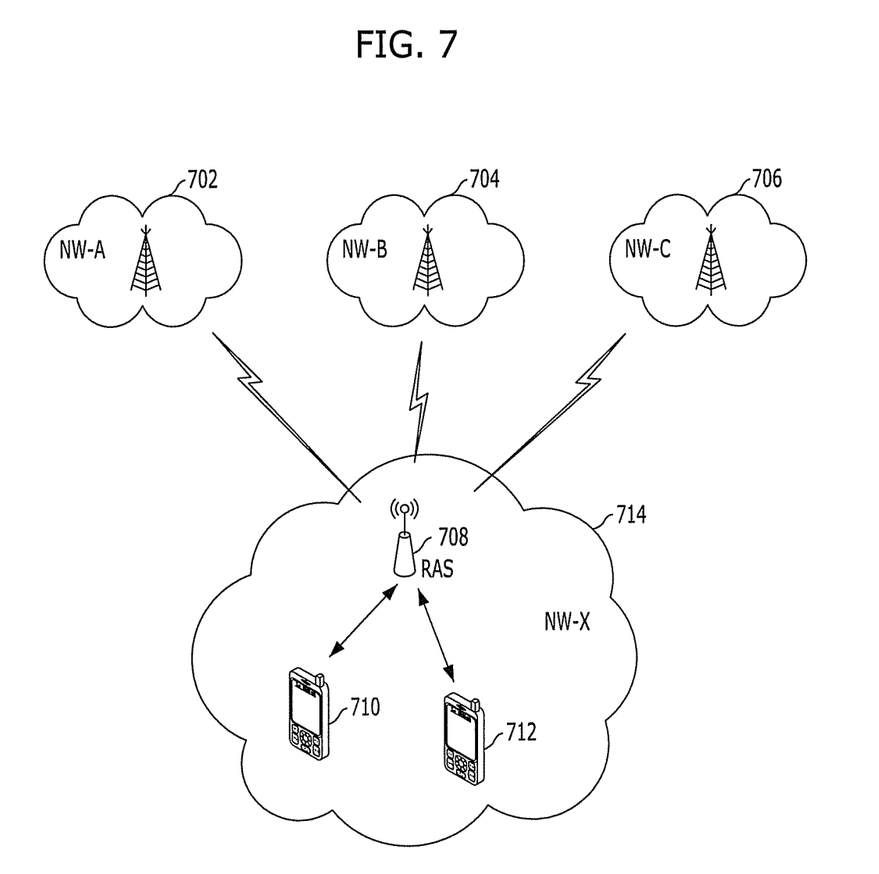
FIG. 7 is a diagram explaining a communication relay method in accordance with another embodiment of the present invention.

FIG. 7 is a diagram explaining a communication relay method in accordance with another embodiment of the present invention.

FIG. 7 illustrates a state in which the service is stopped because terminals 710 and 712 are not connected to neighboring networks. A RAS 708 senses the modes of the terminals 710 and 712 by using the object sensing function through the active scanning operation, and confirms that the terminals 710 and 712 are requesting the service. The RAS 708 senses the modes of a network A 702, a network B 704, and a network C 706, which are positioned in the neighborhood, compares the modes of the networks with the modes of the terminals 710 and 712, and confirms that there is no network having the mode coinciding with those of the terminals 710 and 712. The RAS 708 builds a virtual network 714 using the modes of the terminals 710 and 712 and confirms whether or not it may provide a service. Then, the RAS accesses the terminals 710 and 712 and directly relays the communication to provide a stable service to a user.

In addition, when the state of the channel which has been providing a service through the virtual network becomes poor due to the variations in the neighboring network environment or another network which has been already built in the neighborhood is determined to use the channel, the RAS may switch the channel to another sleep channel which has been sensed and then provide the service. That is, the RAS may perform the spectrum sensing and spectrum switching function.

Figure 8:
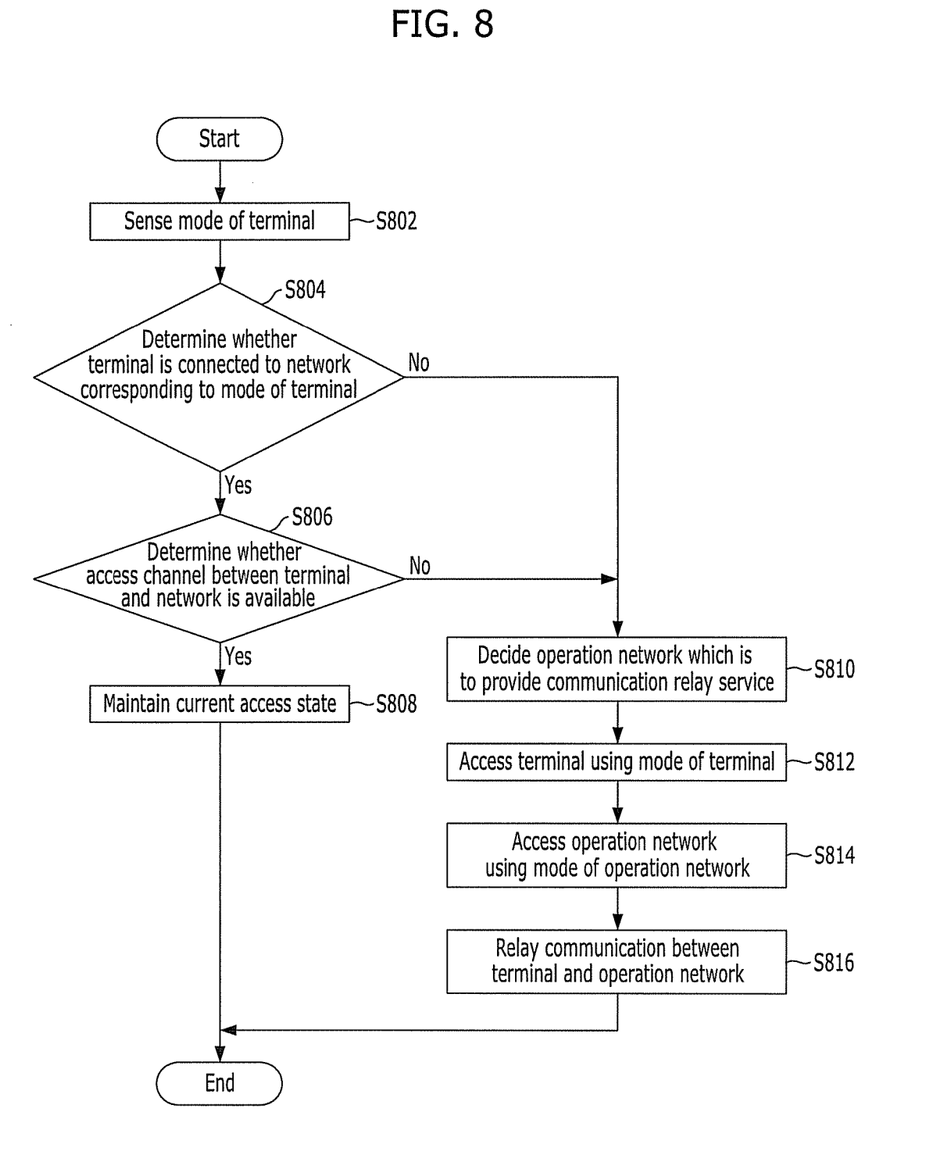
FIG. 8 is a flow chart explaining a communication relay method in accordance with another embodiment of the present invention.

FIG. 8 is a flow chart explaining a communication relay method in accordance with another embodiment of the present invention.

First, the RAS senses the mode of a terminal in a step S802, and determines whether or not the terminal is connected to a network corresponding to the mode of the terminal in a step S803. When the terminal is connected to a network corresponding to the mode of the terminal, the RAS determines whether or not an access channel between the terminal and the network is available in a step S806. When the access channel is available, the RAS maintains the current access state as it is in a step S808.

When it is determined in the step S804 that the terminal is not connected to the network corresponding to the mode of the terminal or it is determined in the step S806 that the access channel between the terminal and the network is not available even though the terminal is connected to the network corresponding to the mode of the terminal, the RAS decides an operation network which is to provide a communication relay service in a step S810. The process for deciding the operation network has been described above with reference to FIG. 2. When the operation network is decided, the RAS accesses the terminal using the mode of the terminal in a step S812, accesses the operation network using the mode of the operation network in a step S814, and relays the communication between the terminal and the operation network in a step S816. The modes of the terminal and the network which are accessed may be identical or different. The communication relay apparatus may transmit and receive information between heterogeneous modes through the mode reconfiguration and switching function.

Figure 9:
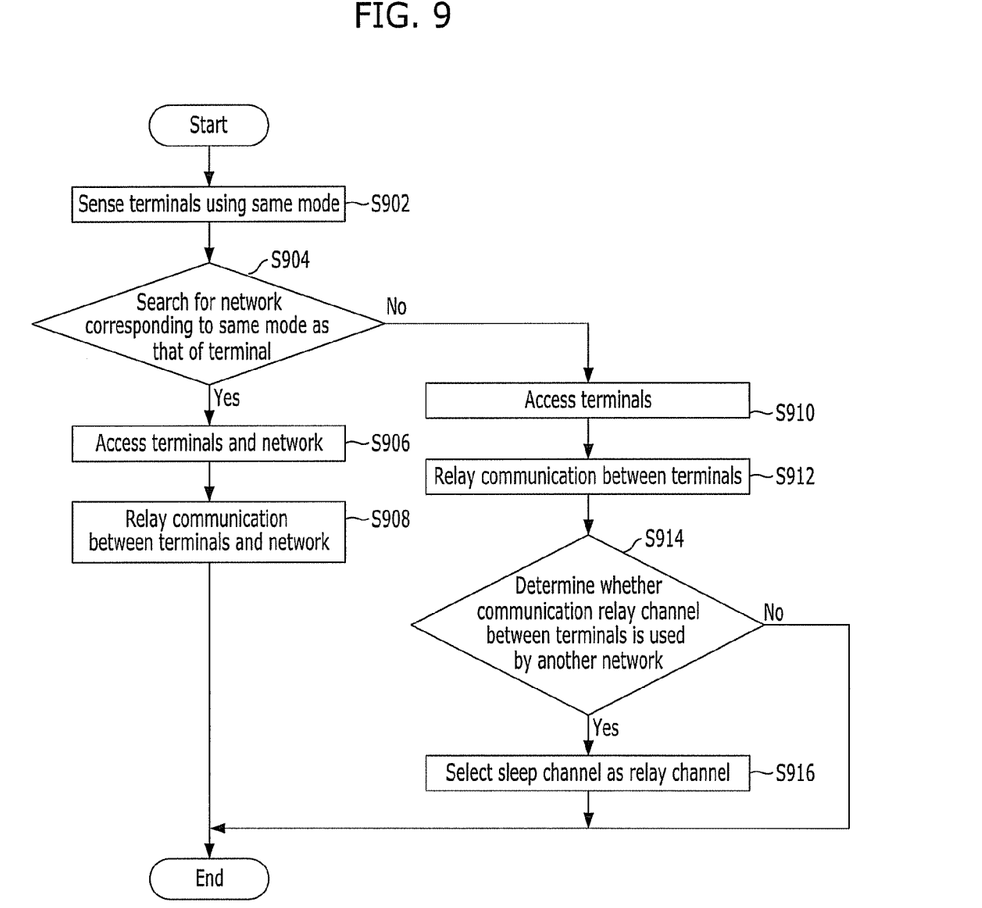
FIG. 9 is a flow chart explaining a communication relay method in accordance with another embodiment of the present invention.

FIG. 9 is a flow chart explaining a communication relay method in accordance with another embodiment of the present invention.

The RAS senses terminals using the same mode in a step S902, and searches for a network corresponding to the same mode as that of the terminals in a step S904.

When the network corresponding to the same mode is searched for, the RAS accesses the terminals and the network in a step S906, and relays the communication between the terminals and the network in a step S908.

When there is no network corresponding to the same mode, the RAS accesses the terminals in a step S910, and directly relays the communication between the terminals in a step S912. That is, the RAS builds a virtual network using a specific mode. In this case, the RAS serves as a kind of base station. At this time, the RAS may access two or more terminals, and the communication between the terminals may be performed one-to-many as well as one-to-one. Furthermore, the RAS determines whether or not the communication relay channel between the terminals is used by another network in a step S914. When the communication relay channel is used by another network, the RAS selects a sleep channel, which has been sensed, as the relay channel, and perform the channel switching in a step S916.

In accordance with the embodiments of the present invention, the communication relay method and apparatus may accept the original access scheme of a legacy terminal and selectively connect the legacy terminal to a wireless network through the mode switching function or the like.

Furthermore, the communication relay method and apparatus may sense a channel environment which always varies in a time or frequency region, and provide an optimal communication quality.

Furthermore, the communication relay method and apparatus which is capable of solving a problem in the cell boundary of a wireless communication system or an area in which a specific mode of wireless communication service is not provided.

Furthermore, the communication relay method and apparatus which satisfies a request of an adaptive wireless communication service for optimally using wireless resources.

While the present invention has been described with respect to the specific embodiments, it will be apparent to those skilled in the art that various changes and modifications may be made without departing from the spirit and scope of the invention as defined in the following claims.

What is claimed is:

1. A communication relay method of a communication relay apparatus in a multi-mode wireless environment, comprising:
   sensing a wireless access environment of a terminal based on an object sensing function;
   deciding whether or not to provide a predetermined communication relay service to the terminal; and
   deciding an operation network which is to provide the predetermined communication relay service, where a wireless environment selected as having an optimal quality among the multi-mode wireless environment is provided while maintaining an access mode of the terminal.

2. The communication relay method of claim 1, wherein the terminal comprises a multi-mode terminal and/or a single-mode terminal.

3. The communication relay method of claim 1, wherein said sensing a wireless connection environment of a terminal based on an object sensing function includes:
   sensing the mode of the terminal; and
   determining whether or not the terminal is connected to a network corresponding to the mode of the terminal.

4. The communication relay method of claim 3, wherein said deciding whether or not to provide a predetermined communication relay service to the terminal comprises deciding to provide a communication relay service by active scanning to the terminal, when the terminal is not connected to the network corresponding to the mode of the terminal.

5. The communication relay method of claim 3, wherein said deciding whether or not to provide a predetermined communication relay service to the terminal comprises deciding to provide a communication relay service by passive scanning to the terminal, when the terminal is connected to the network corresponding to the mode of the terminal and is not able to use an access channel with the network corresponding to the mode of the terminal.

6. The communication relay method of claim 1, wherein said deciding an operation network which is to provide the predetermined communication relay service includes:
   searching for one or more accessible networks; and
   measuring the quality of service (QoS) of the one or more networks; and
   selecting a network having the highest QoS as the operation network, depending on the measurement result.

7. The communication relay method of claim 1, further comprising:
   accessing the terminal by using the mode of the terminal;
   accessing the operation network by using the mode of the operation network; and
   relaying the communication between the terminal and the operation network.

8. The communication relay method of claim 7, wherein said relaying the communication between the terminal and the operation network comprises performing communication relay between heterogeneous modes through a mode switching function, when the mode of the terminal is different from the mode of the operation network.

9. A communication relay method of a communication relay apparatus in a multi-mode wireless environment, comprising:
   sensing two or more terminals using the same mode based on an object sensing function;
   searching for a network corresponding to the same mode as that of the two or more terminals; and
   providing a predetermined communication relay service to the two or more terminals based on the searching result, where a wireless environment selected as having an optimal quality among the multi-mode wireless environment is provided while maintaining an access mode of at least one of the two or more terminals.

10. The communication relay method of claim 9, wherein said providing a predetermined communication relay service to the two or more terminals by using the searching result includes:
   when a network corresponding to the same mode as that of the two or more terminals is searched for,
   accessing the two or more terminals;
   accessing the network; and
   relaying the communication between the two or more terminals and the network.

11. The communication relay method of claim 9, wherein said providing a predetermined communication relay service to the two or more terminals by using the searching result includes:
   when a network corresponding to the same mode as that of the two or more terminals is not searched for,
   accessing the two or more terminals; and
   relaying the communication between the two or more terminals.

12. The communication relay method of claim 11, further comprising:
   determining whether or not a communication relay channel between the two or more terminals is used by another network; and
   when it is determined that the channel relay channel is used by the network, selecting a sleep channel, which is not used by the network, as the communication relay channel.

13. A communication relay apparatus in a multi-mode wireless environment, comprising:
   a sensing unit configured to sense a wireless connection environment of a terminal through an object sensing function;
   a decision unit configured to decide whether or not to provide a predetermined communication relay service to the terminal; and
   a control unit configured to decide an operation network which is to provide the predetermined communication relay service, where a wireless environment selected as having an optimal quality among the multi-mode wireless environment is provided while maintaining an access mode of the terminal.

14. The communication relay apparatus of claim 13, wherein the sensing unit includes:
   a terminal sensing section configured to sense the mode of the terminal; and
   an access determination section configured to determine whether or not the terminal is connected to a network corresponding to the mode of the terminal.

15. The communication relay apparatus of claim 13, wherein the decision unit decides to provide a communication relay service by active scanning to the terminal, when the terminal is not connected to the network corresponding to the mode of the terminal, and decides to provide a communication relay service by passing scanning to the terminal, when the terminal is connected to the network corresponding to the mode of the terminal and is not able to use a connection channel with the network corresponding to the mode of the terminal.

16. The communication relay apparatus of claim 13, wherein the control unit includes:
   a searching section configured to search for one or more accessible networks;
   a measurement section configured to measure the quality of service (QoS) of the one or more networks; and
   a selection section configured to select a network having the highest QoS as the operation network, depending on the measurement result.

17. The communication relay apparatus of claim 13, further comprising:
   an access unit configured to access the terminal by using the mode of the terminal and access the operation network by using the mode of the operation network; and
   a relay unit configured to relay the communication between the terminal and the operation network.

18. A communication relay apparatus in a multi-mode wireless environment, comprising:
   a sensing unit configured to sense two or more terminals using the same mode based on an object sensing function;
   a network searching unit configured to search for a network corresponding to the same mode as that of the two or more terminals; and
   a control unit configured to provide a predetermined communication relay service to the two or more terminals based on the searching result, where a wireless environment selected as having an optimal quality among the multi-mode wireless environment is provided while maintaining an access mode of at least one of the two or more terminals.

19. The communication relay apparatus of claim 18, wherein the control unit includes:
   an access section configured to access the two or more terminals or the network; and
   a relay section configured to relay the communication between the two or more terminals or between the two or more terminals and the network.

20. The communication relay apparatus of claim 19, further comprising:
   a channel searching unit configured to determine whether or not a communication relay channel between the two or more terminals is used by another network; and
   a channel switching unit configured to select a sleep channel, which is not used by the network, as the communication relay channel, when it is determined that the communication relay channel is used by the network.

* * * * *